(12) United States Patent
Haynes (10) Patent No.: US 11,155,118 B1
(45) Date of Patent: Oct. 26, 2021

(54) WHEEL CENTER CAP ASSEMBLY

(71) Applicant: Jennifer Haynes, Nacogdoches, TX (US)

(72) Inventor: Jennifer Haynes, Nacogdoches, TX (US)

(*) Notice: Subject to any disclaimer, the term of this patent is extended or adjusted under 35 U.S.C. 154(b) by 0 days.

(21) Appl. No.: 17/168,087

(22) Filed: Feb. 4, 2021

(51) Int. Cl.
*B60B 7/06* (2006.01)
*B60B 7/00* (2006.01)

(52) U.S. Cl.
CPC .......... *B60B 7/068* (2013.01); *B60B 7/0013* (2013.01); *B60B 7/061* (2013.01)

(58) Field of Classification Search
CPC ......... B60B 7/0013; B60B 7/04; B60B 7/068; B60B 7/06
See application file for complete search history.

(56) References Cited

U.S. PATENT DOCUMENTS

| | | | |
|---|---|---|---|
| 2,130,220 A | 9/1938 | Ball | |
| 2,590,363 A | 3/1952 | Adair | |
| 4,761,040 A | 8/1988 | Johnson | |
| 5,190,354 A | 3/1993 | Levy | |
| 5,222,785 A | 5/1993 | Green | |
| 5,290,094 A | 3/1994 | Gragg | |
| 5,945,609 A | 8/1999 | Kashimura et al. | |
| 6,536,848 B1 | 3/2003 | Goodman | |
| 7,100,995 B2 | 9/2006 | Gilly | |
| 9,701,156 B2 | 7/2017 | Baiz | |
| 9,902,195 B2 | 2/2018 | Castro-Villanueva | |
| 9,908,364 B2 | 3/2018 | Haynes | |
| 2007/0228807 A1 | 10/2007 | Leslie | |
| 2008/0116736 A1 | 5/2008 | Freeman | |
| 2013/0076106 A1 | 3/2013 | Mooney | |
| 2019/0232716 A1 | 8/2019 | Roll | |

*Primary Examiner* — Jason R Bellinger
(74) *Attorney, Agent, or Firm* — Jafari Law Group, Inc.; David V. Jafari; Saul Acherman (57) ABSTRACT

The invention concerns wheel center cap assemblies that include an adapter and a wheel center cap that registers with, or is integral with, the adapter. In some embodiments, the adapter includes tracks and lug sleeves that couple with lugs of the vehicle wheel. Each of the lug sleeves is slidably coupled to each of the tracks of the adapter, and each of the lug sleeves is adapted to move along a length of the tracks; this helps ensure that the adapter is universally compatible with multiple wheel models. In other embodiments, an adapter has a body adapted to be inserted within the center aperture of the wheel. A posterior support registers with the adapter and is sandwiched between a rotor of the vehicle and the wheel to secure the adapter inside the aperture of the wheel; a removable wheel center cap registers with the adapter to adorn the wheel.

19 Claims, 11 Drawing Sheets

WHEEL CENTER CAP ASSEMBLY

TECHNICAL FIELD OF THE INVENTION

The present invention generally relates to wheel center caps, and more specifically, to wheel center cap assemblies that facilitate installing a wheel center cap on any type of vehicle wheel.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Center caps have been around for a long time and are well known. New vehicles delivered to car lots which are sold to buyers conventionally have been delivered with hub caps or wheel center caps which engage to the wheel. Manufacturers generally place indicia on these wheel covers which bears their name, and/or the name of the car model to which the wheel hubcap or center cap is engaged. Frequently car owners also purchase customized wheels for their vehicles for both decorative and performance purposes. In a similar fashion to that of the car manufacturers, such customized wheels also are supplied with center caps adapted to engage with the outer facing surface of the wheel when mounted on a vehicle. In fact, the prior art is filled with a variety of center caps and systems for installing the same. Nevertheless, there are several shortcomings in the prior art that remain unaddressed.

While such new vehicles and newly purchased custom wheels bear an attractive appearance when new, over time vehicle wheels live a tortuous life on the road and are exposed to weather, jarring roadways, bumps, and other hazards which will result in the loss of one or more of the original wheel centers. Theft can also play a role in the loss of such decorative wheel covering components.

One problem is the problem of dissimilar wheel lug nut spacing and patterns. Some vehicle wheels have lug patterns which engage five lugs in a particular spacing, while others will also engage five lugs but in a different spacing thereof around the wheel and from each other. Other wheels and vehicles may have six lugs and there can be multiple spacings and patterns of this number of lugs engaging wheels also. Trying to properly place replacement center caps properly positioned in the open central area of wheels, given the huge number of potential lug and wheel configurations, becomes more challenging as more wheels become available and as older wheels become obsolete. The consequence of this is a severe limiting of the availability of replacement wheel center caps which might be engaged within the wheel openings because of the sheer number of lug configurations, wheel configurations, and lug spacings.

Another problem is the typical cumbersome installation, that typically requires the wheel to be completely removed and adapters for the center cap to be installed from behind the wheel. This requires more installation time and thus higher labor costs. Moreover, this makes exchanging or upgrading a center cap a task for a professional rather than most consumers, in that a vast number of consumers may not have the equipment at home for completely removing a wheel.

As such, there exists an unmet need for a wheel center cap mounting system or assembly, which provides an easy to install assembly that obviates having to remove the wheel of the vehicle and is compatible with a wide variety of lug spacings for different wheel types. It is to these ends that the present invention has been developed.

BRIEF SUMMARY OF THE INVENTION

The present invention is a wheel center cap assembly that facilitates installing a wheel center cap on any type of vehicle wheel.

Generally, the invention concerns wheel center cap assemblies that include an adapter and a wheel center cap that registers with, or is integral with, the adapter. In some embodiments, the adapter includes tracks and lug sleeves that couple with lugs of the vehicle wheel. Each of the lug sleeves is slidably coupled to each of the tracks of the adapter, and each of the lug sleeves is adapted to move along a length of the tracks; this helps ensure that the adapter is universally compatible with multiple wheel models. In other embodiments, an adapter has a body adapted to be inserted within the center aperture of the wheel. A posterior support registers with the adapter and is sandwiched between a rotor of the vehicle and the wheel to secure the adapter inside the aperture of the wheel; a removable wheel center cap registers with the adapter to adorn the wheel.

In some exemplary embodiments, a wheel center cap assembly may include: an adapter configured to couple with a center region of a vehicle wheel, the adapter including a plurality of tracks; a plurality of lug sleeves configured to couple with a plurality of lugs of the vehicle wheel, at least one of the plurality of lug sleeves slidably coupled to at least one of the plurality of tracks of the adapter; and a wheel center cap removably coupled to a center region of the adapter.

In some exemplary embodiments, a wheel center cap assembly may include: an adapter having an annular body and configured to couple with a center region of a vehicle wheel, the adapter including a plurality of tracks on a posterior surface of the annular body that extend radially from a center region of the adapter; a plurality of lug sleeves configured to couple with a plurality of lugs of the vehicle wheel, at least one of the plurality of lug sleeves slidably coupled to at least one of the plurality of tracks of the adapter; and a wheel center cap removably coupled to the center region of the adapter.

In some exemplary embodiments, a wheel center cap assembly may include: an adapter configured to couple with a center region of a vehicle wheel, the adapter including a plurality of tracks; a plurality of lug sleeves configured to couple with a plurality of lugs of the vehicle wheel, at least one of the plurality of lug sleeves slidably coupled to at least one of the plurality of tracks of the adapter; and a wheel center cap removably coupled to a center region of the adapter, wherein each lug sleeve comprises: a cylindrical body with a top surface and a bottom surface; a track receiving cavity on the top surface of the lug sleeve configured to register with at least one of the plurality of tracks of the adapter so that the lug sleeve can move along a length of the at least one of the plurality of tracks; and a lug receiving aperture on the bottom surface.

In some exemplary embodiments, a wheel center cap assembly may include: an adapter having a cylindrical body adapted to be at least partially inserted within a center aperture of a vehicle wheel, the adapter including an anterior region and a posterior region; a posterior support that registers with the posterior region of the adapter, the posterior support adapted to be sandwiched between a wheel rotor of the vehicle and the vehicle wheel to secure the adapter inside the center aperture of the vehicle wheel; and a removable wheel center cap that registers with the anterior region of the adapter.

In some exemplary embodiments, a wheel center cap assembly may include: an adapter having a cylindrical body adapted to be at least partially inserted within a center aperture of a vehicle wheel, the adapter including an anterior region and a posterior region; a posterior support that registers with the posterior region of the adapter, the posterior support including a flat posterior surface adapted to be sandwiched between a wheel rotor of the vehicle and the vehicle wheel to secure the adapter inside the center aperture of the vehicle wheel; and a removable wheel center cap that registers with the anterior region of the adapter, wherein the posterior region of the adapter includes a posterior cylindrical surface adapted to register with a protruding cylindrical surface of the posterior support.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

The wheel center cap assembly as disclosed herein are further described in terms of exemplary embodiments. These exemplary embodiments are described in detail with reference to the drawings, which have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. These embodiments are non-limiting exemplary embodiments, in which like reference numerals represent similar structures throughout the several views of the drawings. The drawings that accompany the detailed description can be briefly described as follows:

FIG. 9D illustrates an anterior view of the universal wheel cap assembly system depicted in FIG. 9, including a wheel o which the system is coupled to.

FIG. 9E illustrates a cross-sectional view of the universal wheel cap assembly depicted in FIG. 9.

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

For purposes of this disclosure, the terms "upper", "lower", "right", "left", "rear", "front", "vertical", "horizontal" and derivatives thereof shall relate to the invention as oriented in the figures. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics related to the embodiments disclosed herein are not to be considered as limiting, unless the claims expressly state otherwise.

As used in this disclosure, the term "comprise" and variations of the term, such as "comprising" and "comprises," are not intended to exclude other additives, components, ingredients or steps.

Figures 1, 1A:
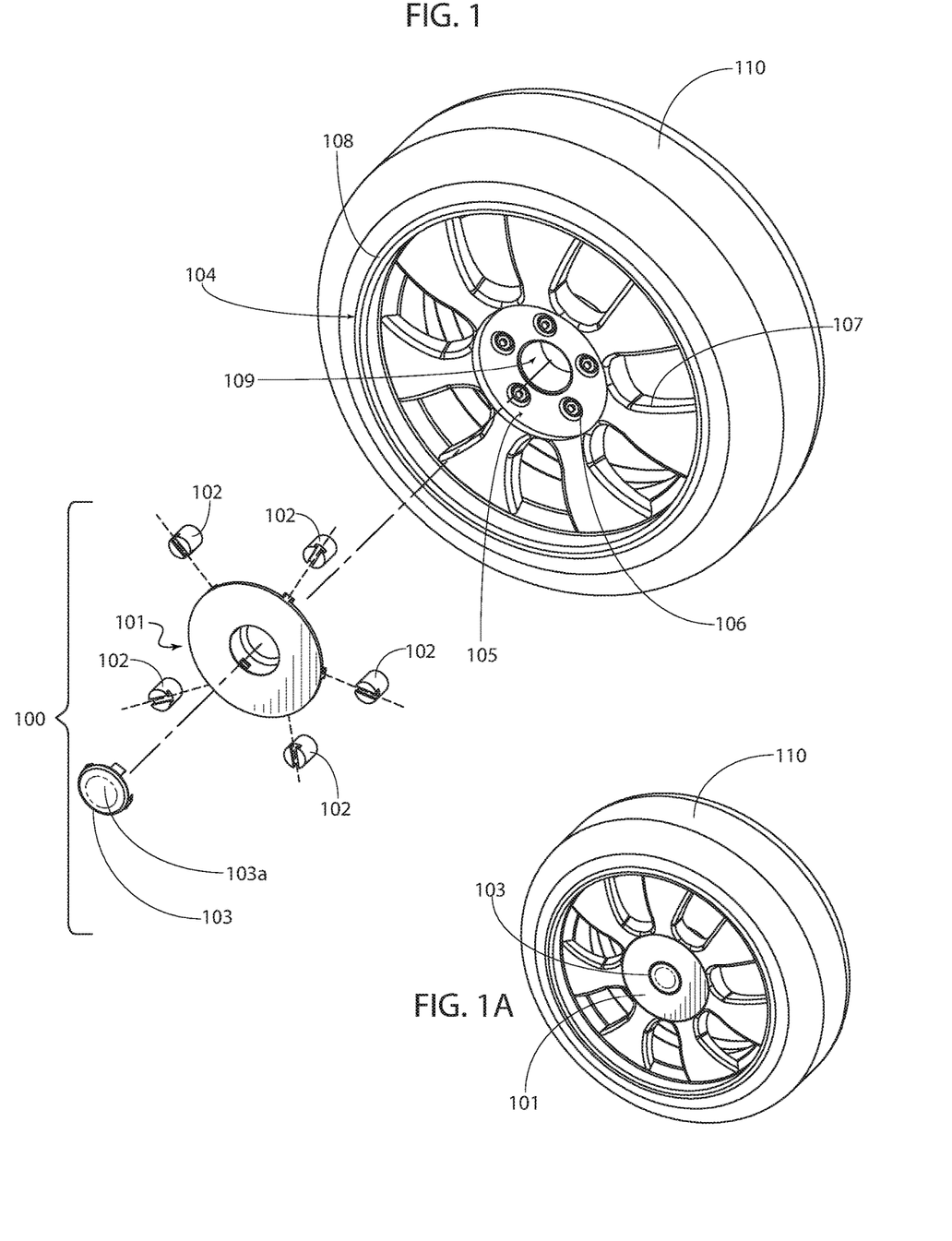
FIG. 1 illustrates an exploded perspective view of a universal wheel cap assembly system in accordance with some exemplary embodiments of the present invention.
FIG. 1A illustrates an assembled view of a universal wheel cap assembly system in accordance with some exemplary embodiments of the present invention

Turning now to the figures, and particularly to FIG. 1, an exploded perspective view of a universal wheel cap assembly system in accordance with some exemplary embodiments of the present invention is illustrated. More specifically, FIG. 1 depicts a universal wheel cap assembly system (system 100), in an exploded view, prior to being assembled onto a wheel of a vehicle. System 100 may generally include an adapter 101, a plurality of lug sleeves 102, which are slidably coupled to the adapter 101 via a plurality of tracks on an anterior surface of the adapter 101, each of the tracks adapted to register with a portion of one of the plurality of lug sleeves 102, and a wheel center cap (cap 103), that registers with a center region of the adapter 101. As may be appreciated from this view, adapter 101 couples to a portion of a vehicle wheel 104 in order to adorn a center region 105 of the wheel 104.

In exemplary embodiments, adapter 101 has a front surface that is configured to conceal the wheel's bolts 106 and bolt holes that typically surround the center region 105 from which the spokes 107 radiate towards the rim 108 of the wheel 104. At the center region 105 of wheel 104, an opening 109 is typically covered by a center cap, and system 100 enables a user to install cap 103 and any other center cap that is universally compatible with adapter 101 of system 100. That is, a generic center cap, or a previously installed center cap, may be desirably replaced with a center cap in accordance with he present invention, such as cap 103. To these ends, at least a portion of adapter 101 is configured to register with a center opening 109 of the wheel 104 in order to secure a portion of adapter 101 to wheel 104. As will be explained further below, lug sleeves 102 will further secure adapter 101 to wheel 104. Once secured to wheel 104, cap 103 can be coupled to adapter 101. In turn, several of the exemplary elements of system 100 are discussed in more detail.

Adapter 101 may be constructed of a wide variety of materials without deviating from the scope of the present invention; generally materials that are durable, lightweight, and easy to maintain so that the portion of the adapter 101 that remains visible when installed has a desirable look and ornamental appeal. For example, and without limiting the scope of the present invention, adapter 101 may comprise aluminum, steel, plastic polymers, a combination of these materials, or any other type of material typically employed by wheels and center caps. Adapter 101 is generally flat or planar, with a round shape configured to register with at least a portion of wheel 104. Adapter 101 typically includes a ring or annulus surface area with a front or anterior annular surface that may be generally flat, and a rear or posterior surface including a plurality of tracks (not fully shown in this view, but see FIG. 3-FIG. 4) adapted to receive a plurality of lug sleeves 102, which register with said tracks.

As will be explained further below and with reference to other figures, each lug sleeve may be selectively secured at a desired position along each track of the adapter 101, which allows adapter 101 to be coupled to a wide range of wheels existing in the market. In some exemplary embodiments, there are just enough tracks and lug sleeves to couple directly with each of the lugs of the wheel 104. In some exemplary embodiments, adapter 101 includes more tracks and lug sleeves than necessary and some of the lug sleeves are removable and may not be required. In some exemplary embodiments, adapter 101 includes a number of tracks and lug sleeves that are less than the number of lugs on wheel 104 but may be secured to wheel 104 with the provided number of lug sleeves. Generally, however, it may be desirable to secure adapter 101 to each available lug of wheel 104, as shown in the embodiment depicted in FIG. 1.

Lug sleeves 102 may be constructed of materials that are lightweight and durable. Generally, each lug sleeve 102 is configured to snuggly fit or secure itself onto lugs 106 of wheel 104. This may be achieved in a number of ways without deviating from the scope of the present invention. In exemplary embodiments, plastics may be used for each lug sleeve so that they are light weight and generally rigid but have some measure of flexibility in order for each lug sleeve to be snapped onto a lug of wheel 104. Each lug sleeve 102 is further configured to register with each trac on the posterior surface of adapter 101. In some exemplary embodiments, each top surface of each lug sleeve 102 has an aperture with corresponding tracks that register with the tracks on the posterior surface of adapter 101. As mentioned above, in some exemplary embodiments, each lug sleeve 102 may be removed from adapter 101.

Cap 103 is a wheel center cap. Cap 103 is removably coupled to adapter 101 so that it is configured to register with a portion of adapter 101. In some exemplary embodiments, for example and without limiting the scope of the present invention, cap 103 snaps into the interior walls of the center region 105 within opening 109 of wheel 104. In exemplary embodiments, cap 103 may include a logo region 103a in which a logo such as a vehicle brand logo may be disposed or form a design of the cap thereof. Cap 101 may be constructed of a wide variety of materials without deviating from the scope of the present invention; generally materials that are durable, lightweight, and easy to maintain so that the portion of cap 103 that remains visible when installed has a desirable look and ornamental appeal. For example, and without limiting the scope of the present invention, cap 103 may comprise aluminum, steel, plastic polymers, or a combination of these materials. Because cap 103 is removable, multiple center caps with varying logos or designs displayed in logo region 103a may be coupled to adapter 101, in order to selectively adorn wheel 104 and thus the look of the vehicle's tires 110. Accordingly, in some exemplary embodiments, system 100 is configured to universally register with any number of center caps with varying center cap designs and or including different logos, so that system 100 is a universal wheel cap assembly compatible with multiple wheel center caps in addition to cap 103.

FIG. 1A illustrates an assembled view of universal wheel cap assembly system 100 in accordance with some exemplary embodiments of the present invention. As may be gleaned from this view, cap 103 is secured to the annular body of adapter 101 and may be flush with the anterior surface of the annular body or may stick out (not shown) depending on the design of cap 103. Notably, in exemplary embodiments, the annular body of adapter 101 conceals the lugs 106 and generally the center region 105 of the wheel 104.

Figure 2:
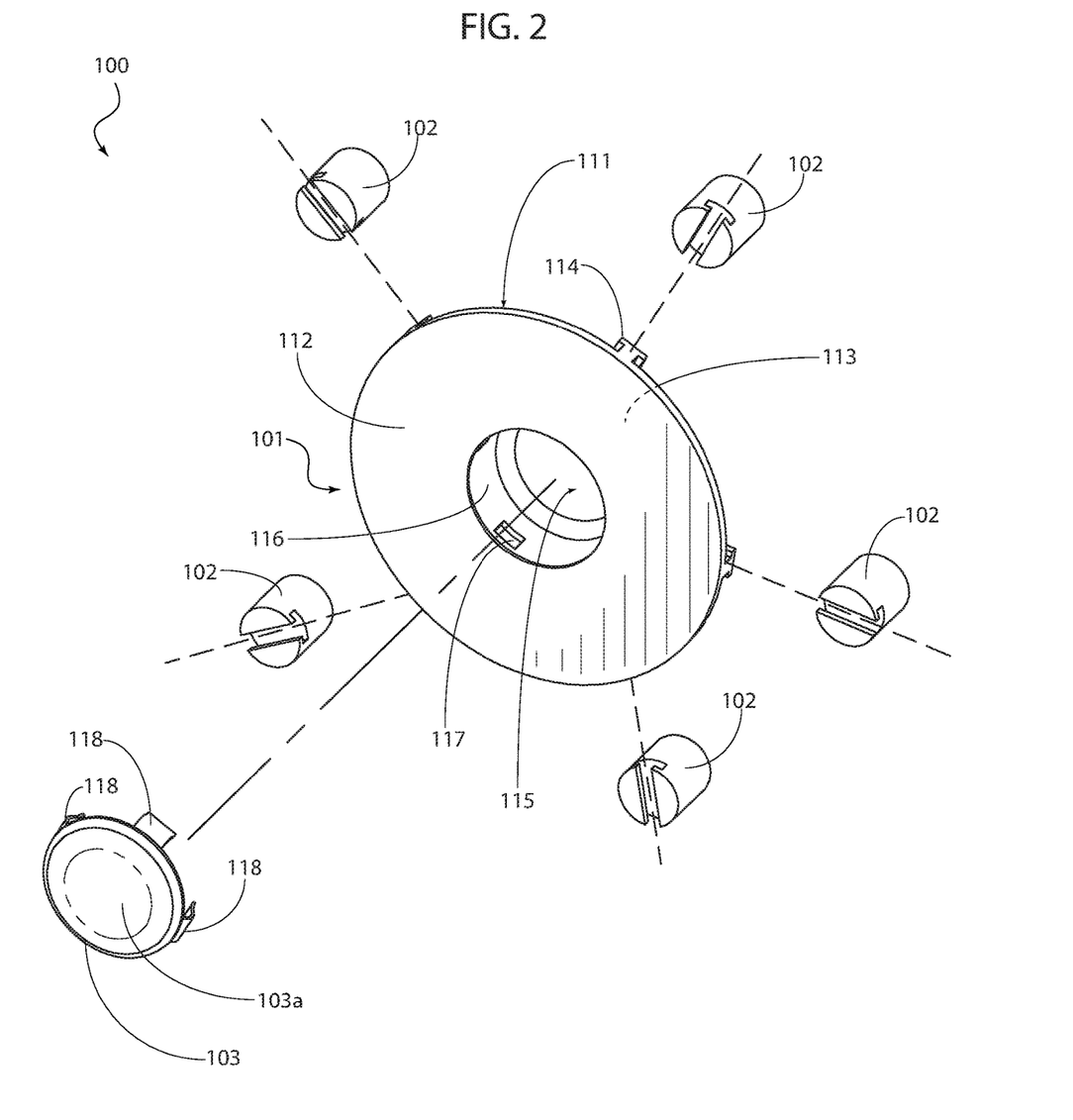
FIG. 2 illustrates an exploded view of a universal wheel cap assembly in accordance with some exemplary embodiments of the present invention.

Turning now to the next figure, FIG. 2 illustrates an exploded view of a universal wheel cap assembly in accordance with some exemplary embodiments of the present invention. More specifically, FIG. 2 depicts a front or anterior view of system 100. From this view, it may be appreciated that in some exemplary embodiments, a body 111 of adapter 101 may be planar and annular with an anterior surface 112 and a posterior surface 113, whereby the anterior surface may be smooth and the posterior surface 113 may include a plurality of tracks 114 that are adapted to slidably receive each of the lug sleeves 102. At the center of the annular body 111, an aperture 115 may be formed in which at least a portion of cap 103 may be removably received. To these ends, an interior surface 116 of the annular body 111 of adapter 101, may include a coupling means 117 to secure portions of the cap 103. For example, and without limiting the scope of the present invention, the coupling means 116 may include small apertures designed to receive pressure clips 118 of cap 103, which snap into place to secure cap 103 into aperture 115 of adapter 101.

Figure 3:
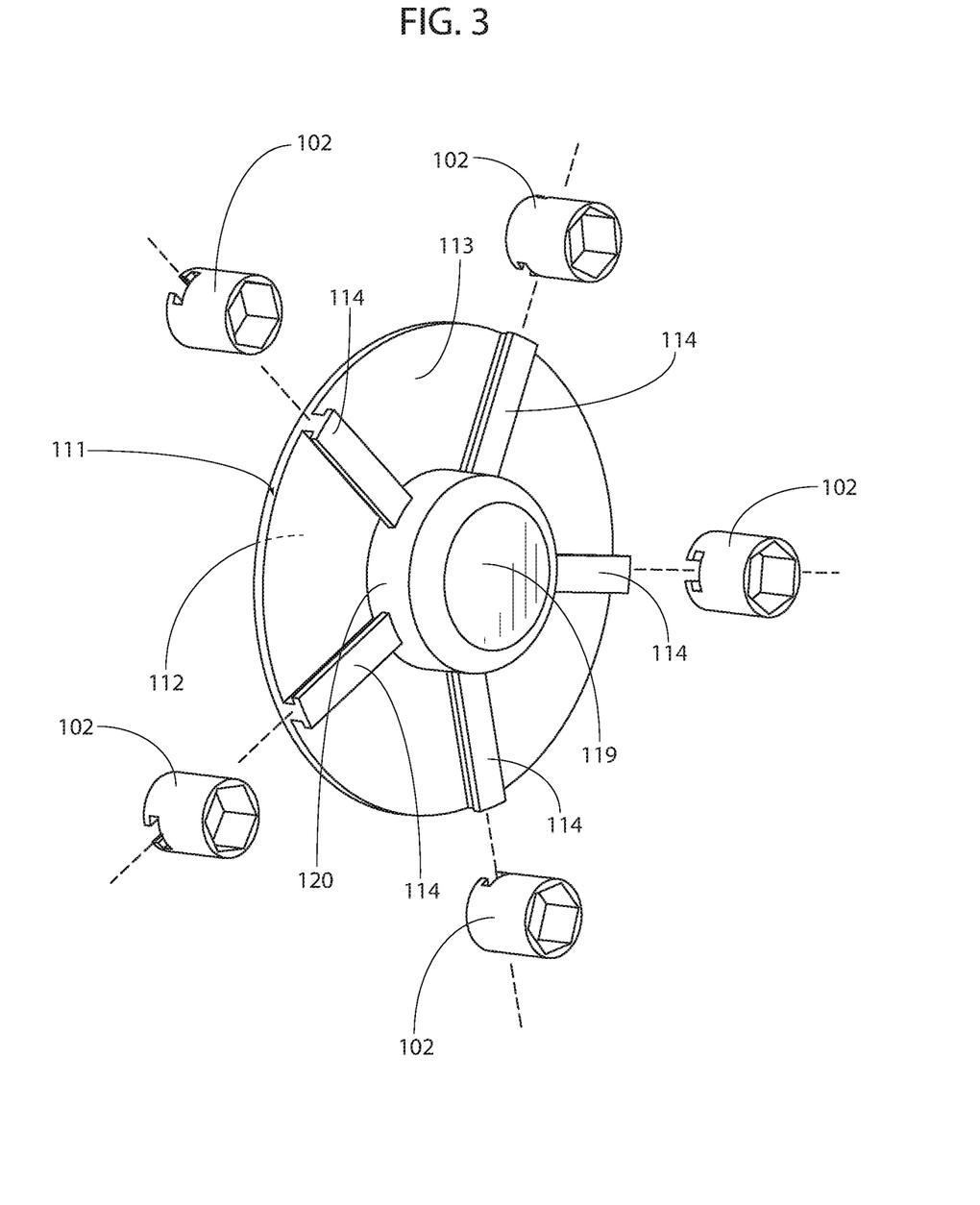
FIG. 3 illustrates a partial exploded view of a universal wheel cap assembly system in accordance with some exemplary embodiments of the present invention.
Figure 4:
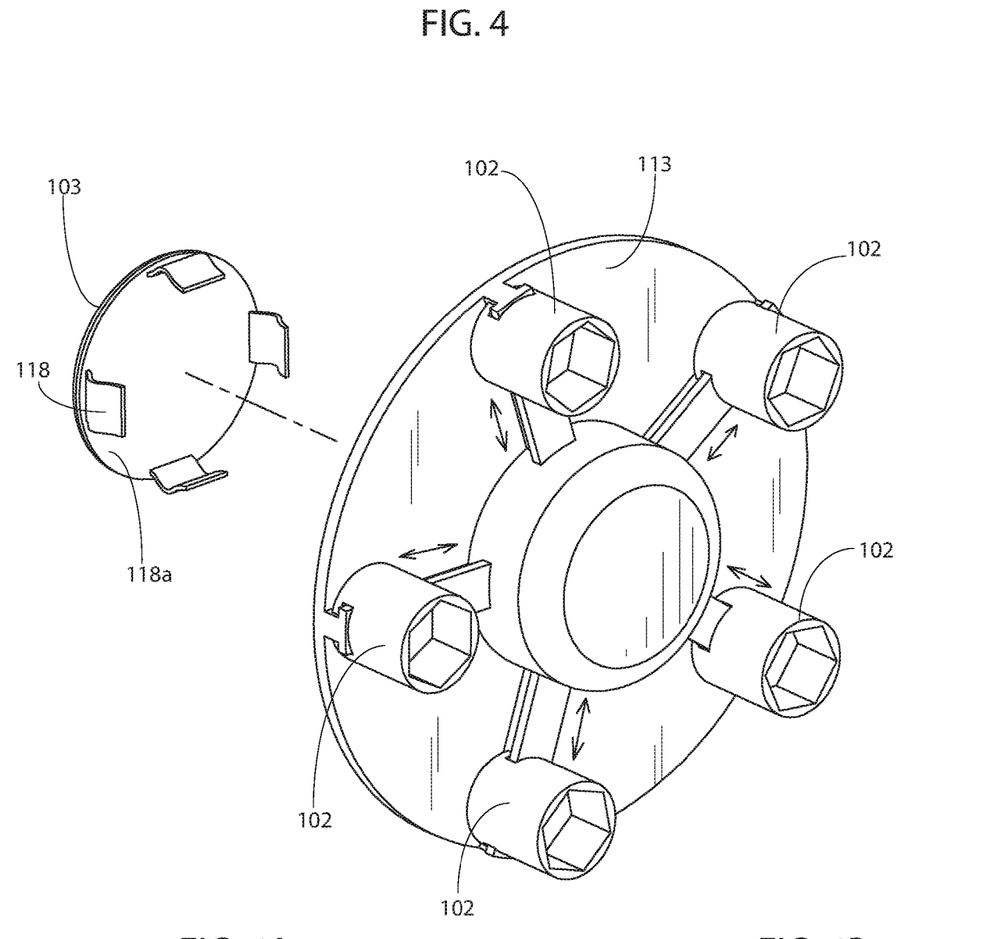
FIG. 4 illustrates a partial exploded view of a universal wheel cap assembly system in accordance with some exemplary embodiments of the present invention.

FIG. 3 illustrates a partial exploded rear view of the universal wheel cap assembly system shown in FIG. 2, and FIG. 4 illustrates another partial exploded rear view thereof depicting the universal wheel cap assembly system with each of the lug sleeves slidably coupled to adapter 101. From these views, it may be appreciated that each of the lug sleeves 102 are configured to slide throughout a length of each of the tracks 114 that radiate from a center hub portion 120, which may be optionally capped with a seal 119 to seal off the aperture 115.

Because each of the lug sleeves 102 can move along a length of each of the tracks 114, each lug sleeve 102 can be placed along a circumference about aperture 115 in order to properly align with a lug alignment of an existing wheel. In this way, adapter 101 is compatible with a wide variety of wheel models and configurations.

Figure 4A:
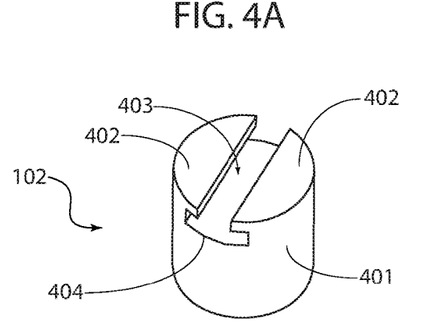
FIG. 4A-FIG. 4B illustrate lug sleeves for a wheel center cap assembly in accordance with some exemplary embodiments of the present invention.
Figure 4B:
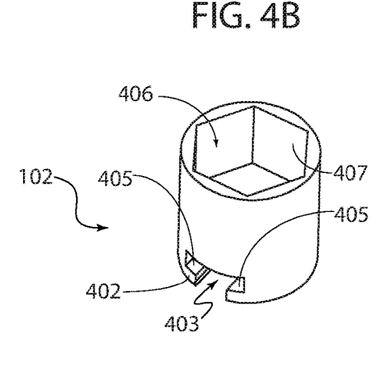
Figure 5:
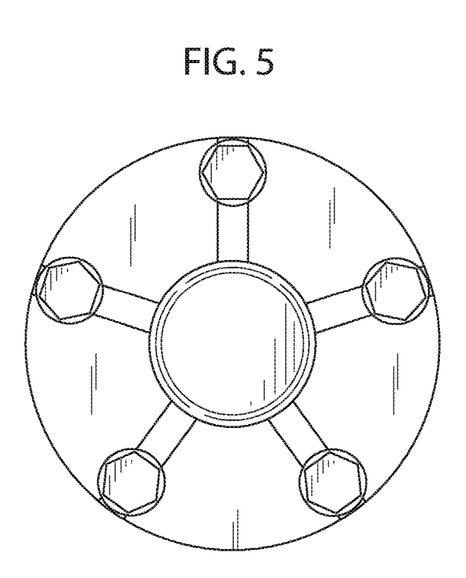
FIG. 5-8 illustrate some exemplary configurations of universal wheel cap assemblies in accordance with some exemplary embodiments of the present invention.
Figure 6:
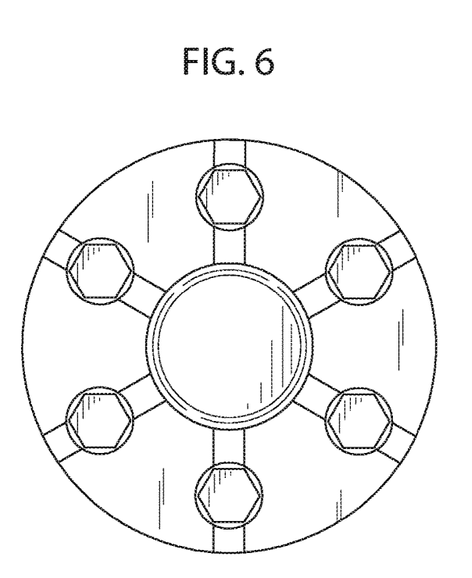
Figure 7:
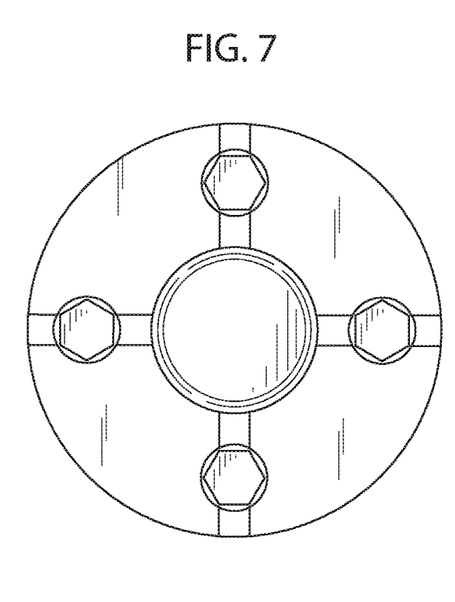
Figure 8:
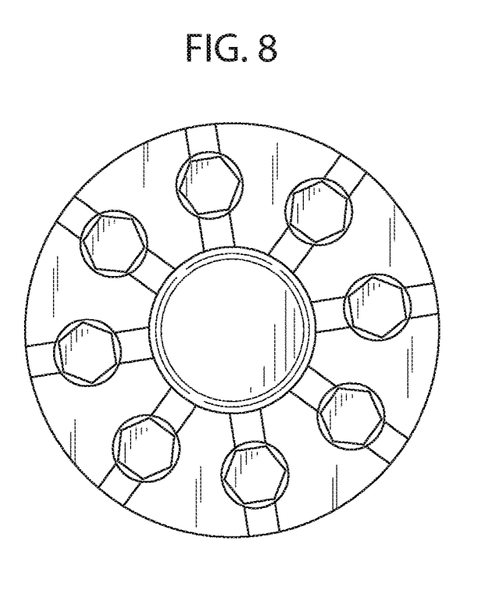

Turning now to the next figures, FIG. 4A-FIG. 4B illustrate lug sleeves for a wheel center cap assembly in accordance with some exemplary embodiments of the present invention. From these views, it may be appreciated that each lug sleeve 102 includes a top portion that is configured to receive or register with a portion of each track 114, and a bottom portion that is configured to receive or register with a portion of a wheel lug.

For example, and without limiting the scope of the present invention, FIG. 4A depicts a top view of an exemplary lug sleeve 102, which includes a cylindrical body 401, a top surface 402 having an aperture that runs along a center length of the top surface 402, and a surface 404 that is configured to receive a top surface of one of the tracks 114 of the adapter 101. So that at least a portion of each lug sleeve 102 is securely held to each track 114 of adapter 101, the top surface 402 with the aperture 403 form a track receiving cavity 403 on the top surface of the lug sleeve 102, and may be formed in such a way that portions of the top surface 402 hang over a portion of surface 404.

As may be better viewed in FIG. 4B, a support member 405 is formed underneath the overhanging portion of surface 402 to form the track receiving cavity 403 therein. At the bottom of each lug sleeve 102, a lug receiving aperture 406 may be formed having a circumference or perimeter 407 that matches a vehicle wheel lug. The perimeter 407 may include a tapered surface designed so that each lug sleeve snuggly receives each lug therein. In some exemplary embodiments, each lug sleeve may further include a clipping means for securing each lug sleeve 102 to the corresponding wheel lug.

As may be appreciated by a person of ordinary skill in the art, different configurations of the present invention may be possible. For example, and without limiting the scope of the present invention, FIG. 5-8 illustrate some exemplary configurations of universal wheel cap assemblies that may include five radially situated tracks adapted to receive five lug sleeves; six radially situated tracks adapted to receive six lug sleeves; four radially situated tracks adapted to receive four lug sleeves; or eight radially situated tracks adapted to receive eight lug sleeves.

Figure 9:
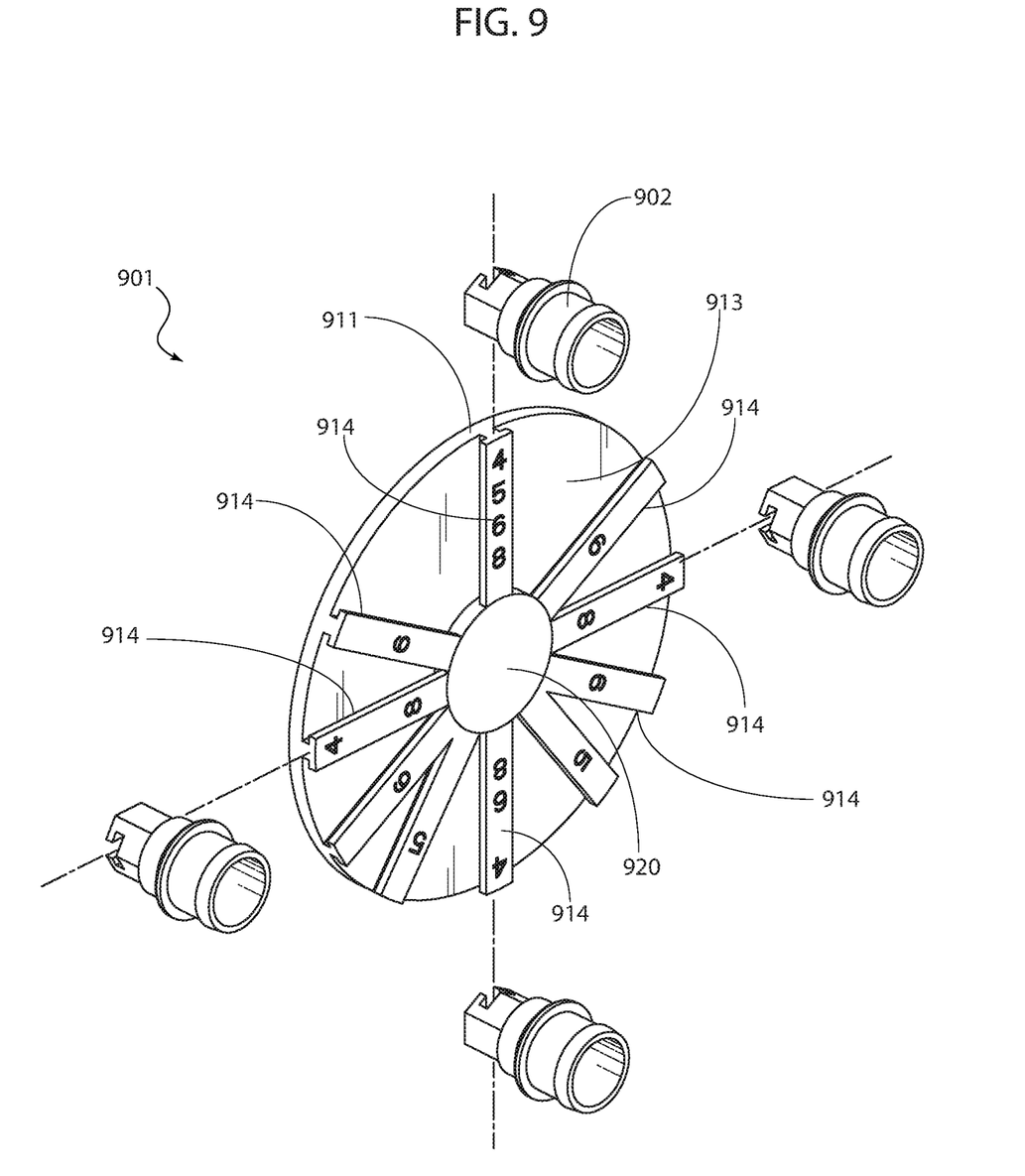
FIG. 9 illustrates a partial exploded posterior view of a universal wheel cap assembly system in accordance with some exemplary embodiments of the present invention.
Figure 9A:
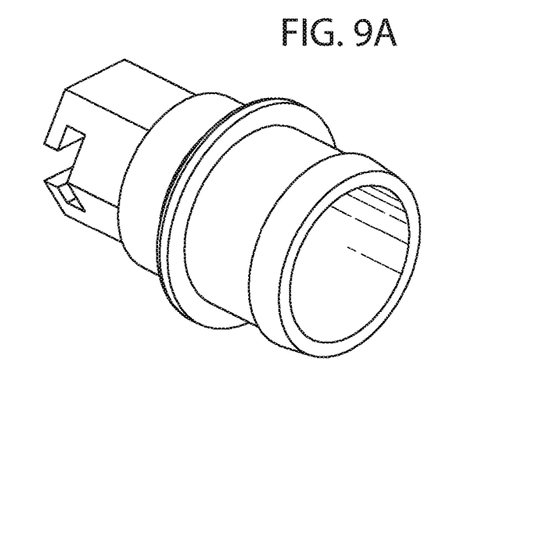
FIG. 9A-FIG. 9B illustrate lug sleeves for a wheel center cap assembly in accordance with some exemplary embodiments of the present invention.
Figure 9B:
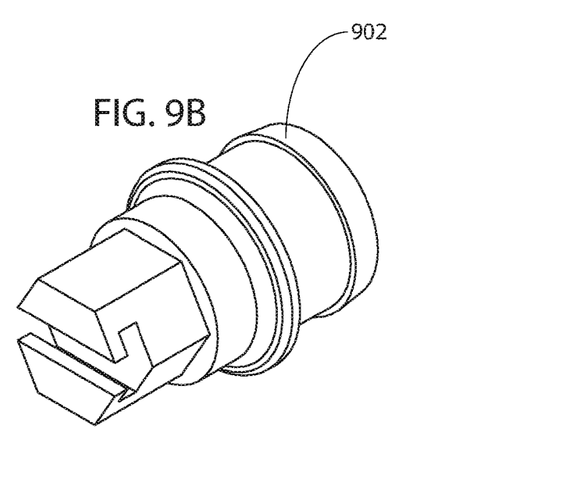
Figure 9C:
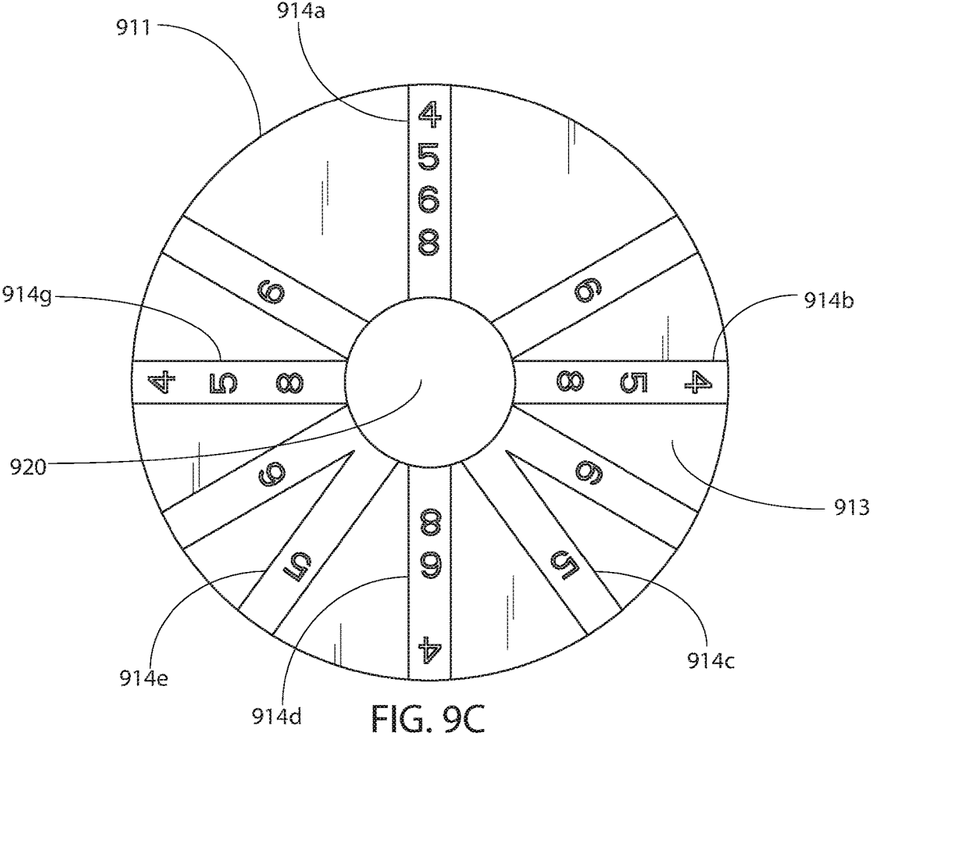
FIG. 9C illustrates a posterior view of the universal wheel cap assembly depicted in FIG. 9.
Figures 9D, 9E:
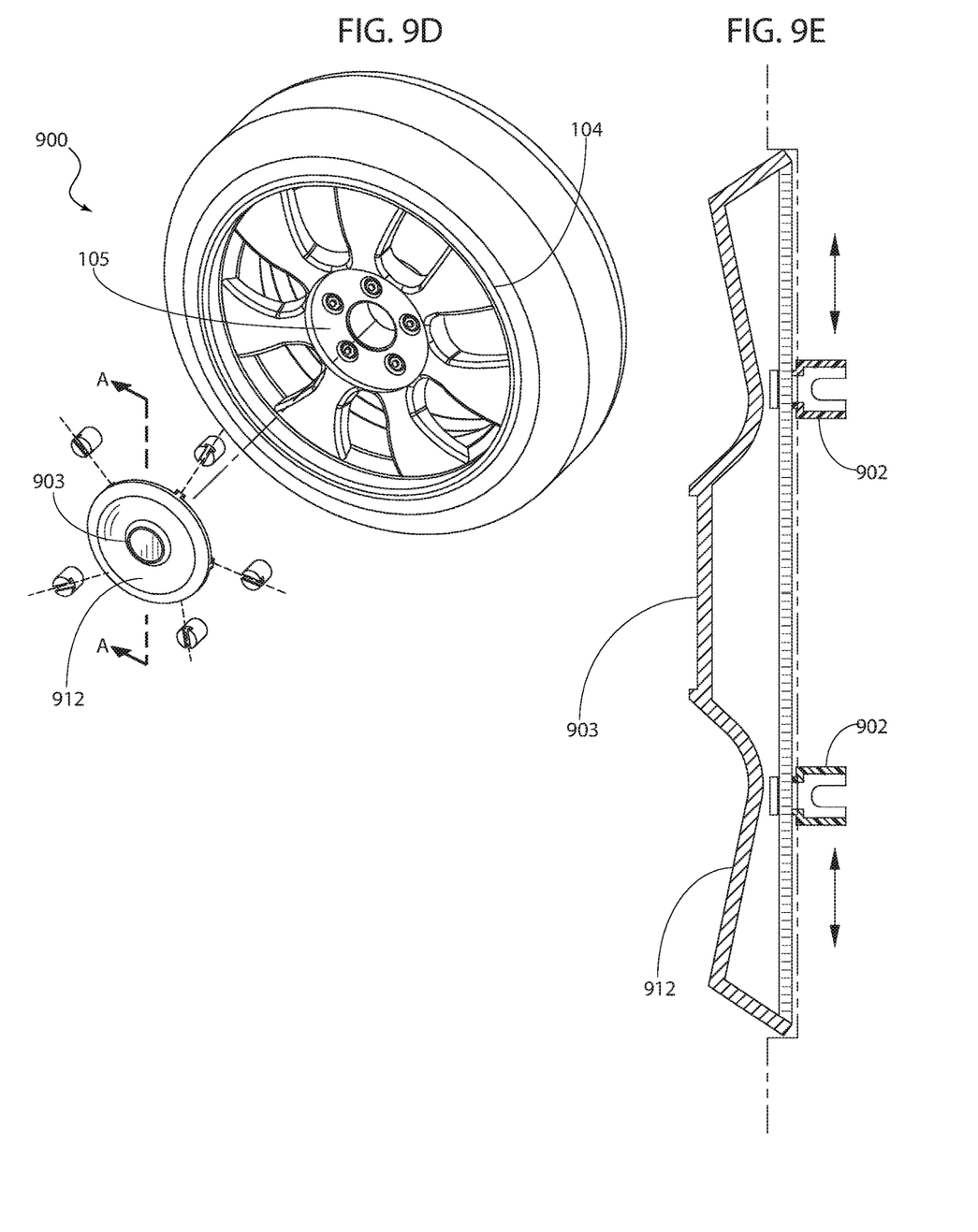

Turning now to the next set of figures, FIG. 9 illustrates a partial exploded posterior view of a universal wheel cap assembly system (system 900) in accordance with some exemplary embodiments of the present invention; FIG. 9A-FIG. 9B illustrate lug sleeves for wheel center cap assembly of system 900; FIG. 9C illustrates a posterior view of the universal wheel cap assembly body depicted in FIG. 9; FIG. 9D illustrates an anterior view of the universal wheel cap assembly system depicted in FIG. 9; and FIG. 9E illustrates a cross-sectional view of the universal wheel cap assembly depicted in FIG. 9. This embodiment of the present invention comprises a universal wheel cap assembly similar to the assembly of system 100 discussed above, except for the configuration of the tracks along the posterior region of the body of the adapter in the assembly of system 900, and also that this embodiment excludes the use of a separate removable cap (such as cap 103) because the adapter excludes a center aperture such as aperture 115; essentially, the adapter includes a body that provides a seal to an existing aperture of a wheel, such as aperture 109 of wheel 104.

Accordingly, FIG. 9-FIG. 9C depict system 900, which may generally include an adapter 901, and a plurality of lug sleeves 902, which are slidably coupled to the adapter 901 via a plurality of tracks 914 on an anterior surface of the adapter 901, each of the tracks 914 is adapted to register with a portion of one of the plurality of lug sleeves 902, and a wheel center cap (cap 903) that is integral with adapter 901 and more specifically that is integral with a center region of the adapter 901. That is, in this embodiment, the cap is not removable but rather is part of the body of the adapter 901. Adapter 901 couples to a portion of a vehicle wheel 904 in order to adorn a center region 105 of the wheel 104.

In exemplary embodiments, adapter 901 has an anterior or front surface 912 that is configured to conceal the wheel's bolts 106 and bolt holes that typically surround the center region 105 from which the spokes 107 radiate towards the rim 108 of the wheel 104. At the center region 105 of wheel 104, an opening 109 is typically covered by a center cap, and system 900 enables a user to adapter 901, which includes an integral cap or cap region 903. To these ends, at least a portion of adapter 901 is configured to register with a center opening 109 of the wheel 104 in order to secure a portion of adapter 901 to wheel 104. To these ends, lug sleeves 902 facilitate securing adapter 901 to wheel 104. Each of the lug sleeves 902 are configured to slide throughout a length of each of the tracks 914 that radiate from a center hub 920. Because each of the lug sleeves 902 can move along a length of each of the tracks 914, each lug sleeve 902 can be placed along a circumference about center hub 920 in order to properly align with a lug alignment of an existing wheel. In this way, adapter 901 is compatible with a wide variety of wheel models and configurations.

In some exemplary embodiments, such as the one displayed in the current view, the adapter of the wheel cap assembly may include a body 911 having a planar disk shape with an anterior surface 912 and a posterior surface 913, whereby the anterior surface may be smooth and the posterior surface 913 may include a plurality of tracks 914 that are adapted to slidably receive each of the lug sleeves 902. At the center of the disk body 911, instead of an aperture, a cap or cap region 903 may be formed so that the wheel cap is integral with adapter 901. Moreover, in this exemplary embodiment, the plurality of tracks 914 are configured to accommodate a combination of 4 lug sleeves, 5 lug sleeves, 6 lug sleeves, or 8 lug sleeves. To these ends, the plurality of tracks may be labeled with markings adapted to instruct a user on a placement of the plurality of lug sleeves. For example, and without limiting he scope of the present invention, if a particular wheel requires the use of 4 lugs, lug sleeves may be coupled to tracks 914a, 914b, 914d, and 914g only. Similarly, if a particular wheel requires the use of 5 lugs, lug sleeves may be coupled to tracks 914a, 914b, 914c, 914e, and 914g only.

FIG. 9A-FIG. 9B illustrate lug sleeves for a wheel center cap assembly system 900. It may be appreciated that each lug sleeve 902 includes a top portion that is configured to receive or register with a portion of each track 914, and a bottom portion that is configured to receive or register with a portion of a wheel lug. These sleeve sleeves have the same features as lug sleeves 102 discussed above.

FIG. 9E illustrates a cross-sectional view of the universal wheel cap assembly, and more specifically, a cross-sectional view of adapter 901 along line segment A-A. From this view, it can be appreciated that wheel cap 903 is integral with a body 911 of the adapter 901.

A method of installing assemblies 100 or 900 may include the following steps. Selecting the number of lug sleeves suitable for the target wheel or set of wheels of a vehicle. Coupling the correct number of lug sleeves to each of the plurality of tracks situated on a posterior surface of the adapter, sliding each lug sleeve to a desired position along the track. Aligning the coupling end of each lug sleeve to each corresponding lug of the wheel. Snapping each lug sleeve onto each corresponding lug. In the case of assembly 100, if a removable wheel center cap is used, then selectively coupling the wheel center cap to the center region of the adapter. In the case of assembly 900, no further steps maybe required, since assembly 900 includes a wheel center cap that is integral with the body of the adapter.

Figures 10, 10A:
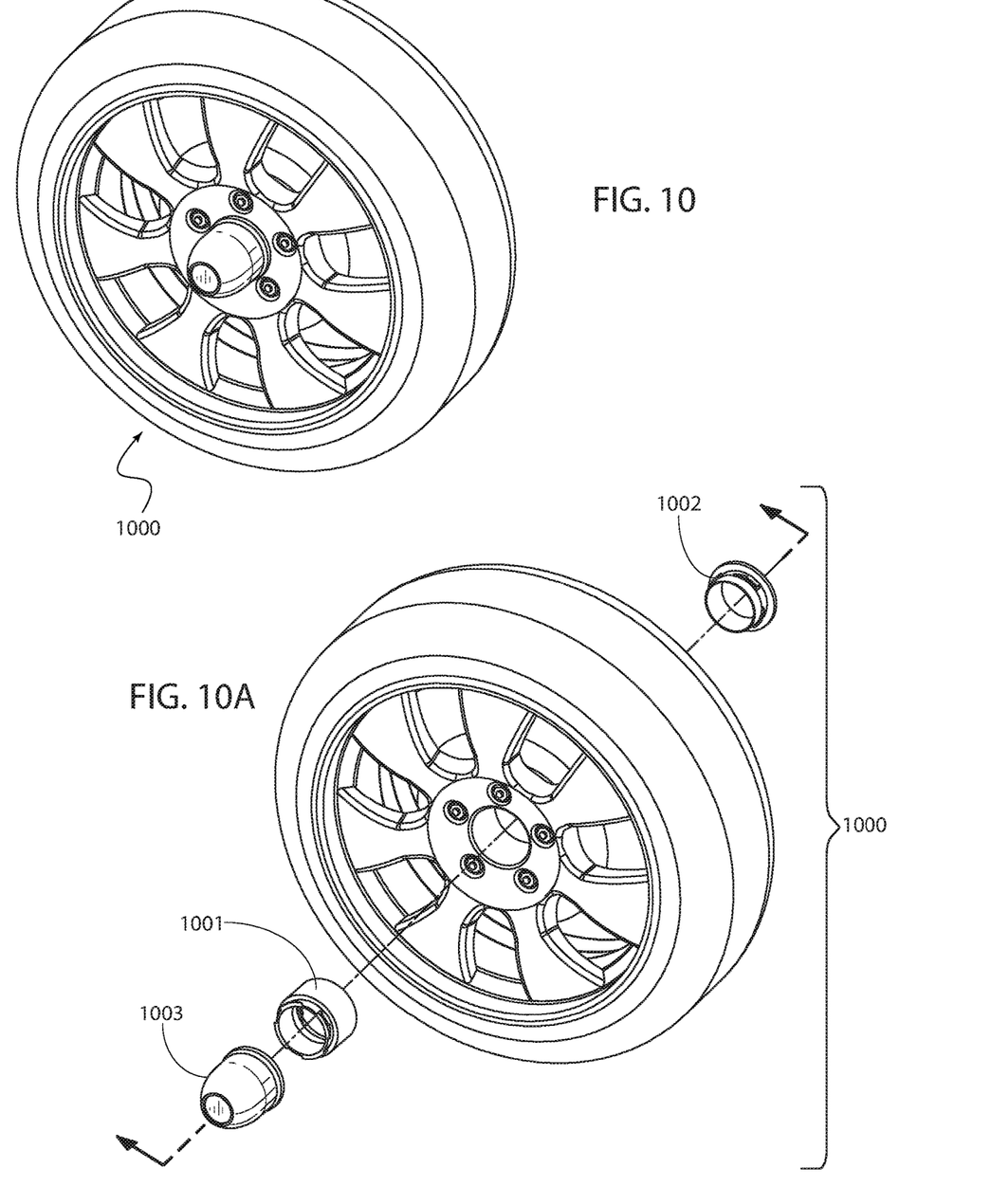
FIG. 10 illustrates a universal center cap assembly system in accordance with some exemplary embodiments of the present invention.
FIG. 10A illustrates an exploded perspective view of a universal wheel cap assembly system in accordance with some exemplary embodiments of the present invention.

Turning now to the next set of figures, FIG. 10 illustrates a universal center cap assembly system in accordance with some exemplary embodiments of the present invention; and FIG. 10A illustrates an exploded perspective view thereof. More specifically, these figures depict wheel center cap assembly system (system 1000). In exemplary embodiments, system 1000 includes an adapter 1001 having a cylindrical body adapted to be at least partially inserted within a center aperture 105 of a vehicle wheel 104, the adapter 1001 including an anterior region 1001a and a posterior region 1001b. Moreover, system 1000 includes a posterior support 1002 that registers with the posterior region 1001b of the adapter 1001. The posterior support 1002 adapted to be sandwiched between a wheel rotor of the vehicle (or rotor plate or rotor region, not shown) and the vehicle wheel 104 to secure the adapter 1001 inside the center aperture 105 of the vehicle wheel 104. Once secured therein, a removable wheel center cap 1003 that registers with the anterior region 1001a of the adapter 1001, may be secured to the adapter 1001. In exemplary embodiments, multiple styles may be provided for removable wheel center cap 1003.

Figure 11:
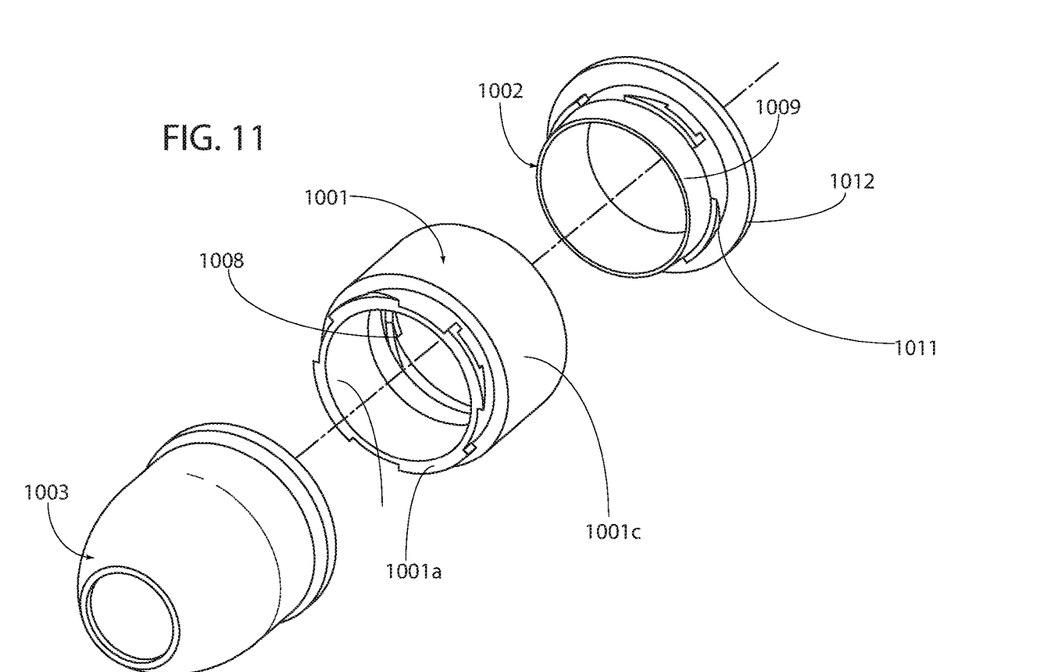
FIG. 11 illustrates an exploded perspective view of a universal wheel cap assembly system in accordance with some exemplary embodiments of the present invention.
Figure 12:
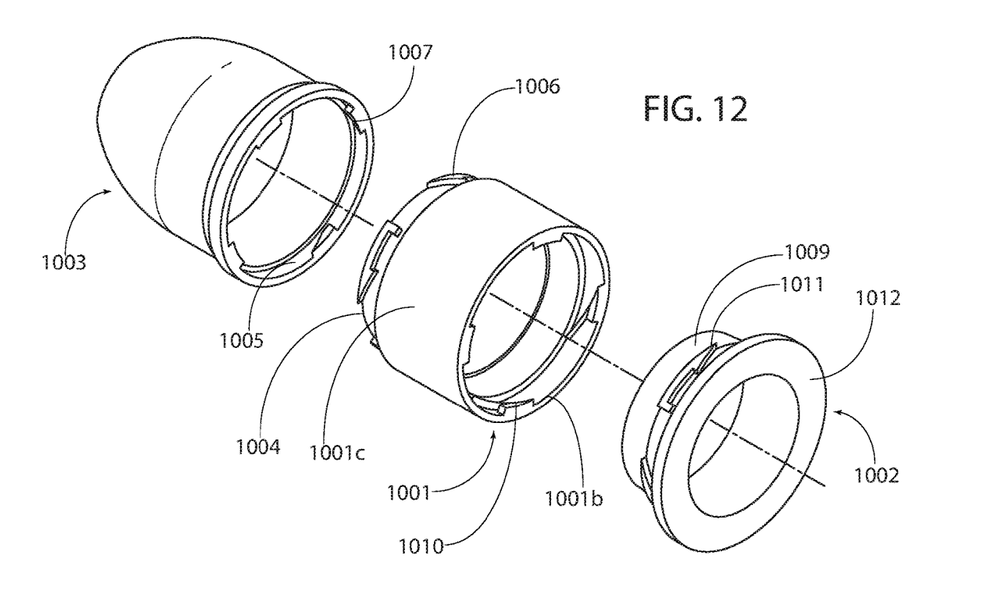
FIG. 12 illustrates another exploded perspective view of the universal wheel cap assembly depicted in FIG. 11.

FIG. 11 illustrates an exploded perspective view of universal wheel cap assembly 1000 in accordance with some exemplary embodiments of the present invention; FIG. 12 illustrates another exploded perspective view of the universal wheel cap assembly depicted in FIG. 11. From these views, several features of the components of assembly 1000 may be appreciated.

The anterior region 1001a of the adapter 1001 includes an anterior cylindrical surface 1004 adapted to register with an interior surface 1005 of the removable wheel center cap 1003. The anterior cylindrical surface 1004 of the adapter 1001 includes one or more protrusions 1006 adapted to secure the removable wheel center cap 1003 to the adapter 1001. Similarly, the removable wheel center cap 1003 includes one or more complementary protrusions 1007 adapted to secure the removable wheel center cap 1003 to the adapter 1001. The posterior region 1001b of the adapter 1001 includes a posterior cylindrical surface 1008 adapted to register with a protruding cylindrical surface 1009 of the posterior support 1002. The posterior cylindrical surface 1008 of the adapter 1001 includes one or more protrusions 1010 adapted to secure the adapter 1001 to the posterior support 1001. Similarly, the posterior support 1002 includes one or more complementary protrusions 1011 adapted to secure the posterior support 1002 to the adapter 1001.

The posterior support 1002 includes a flat posterior surface 1012 adapted to be sandwiched between a wheel rotor of the vehicle (not shown) and the vehicle wheel 104. This secures the posterior support once the vehicle wheel is secured with the lugs, which in turn secures the adapter inside the center aperture 105 of the vehicle wheel 104 by virtue of the adapter being secured to the posterior support 1002.

In some exemplary embodiments, the anterior region 1001a of the adapter 1001 includes a smaller circumference than a center region 1001c of the cylindrical body. In some exemplary embodiments, the posterior region 1001b of the adapter includes a circumference equal to the circumference of the center region 1001c of the cylindrical body.

Figure 13:
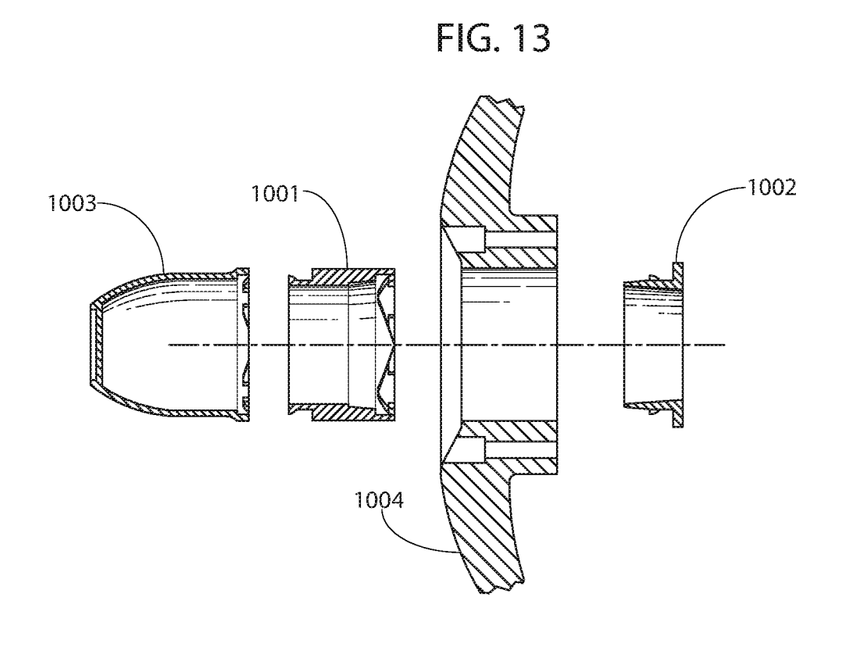
FIG. 13 illustrates a cross-sectional exploded view of a universal wheel cap assembly system in accordance with some exemplary embodiments of the present invention.
Figure 14:
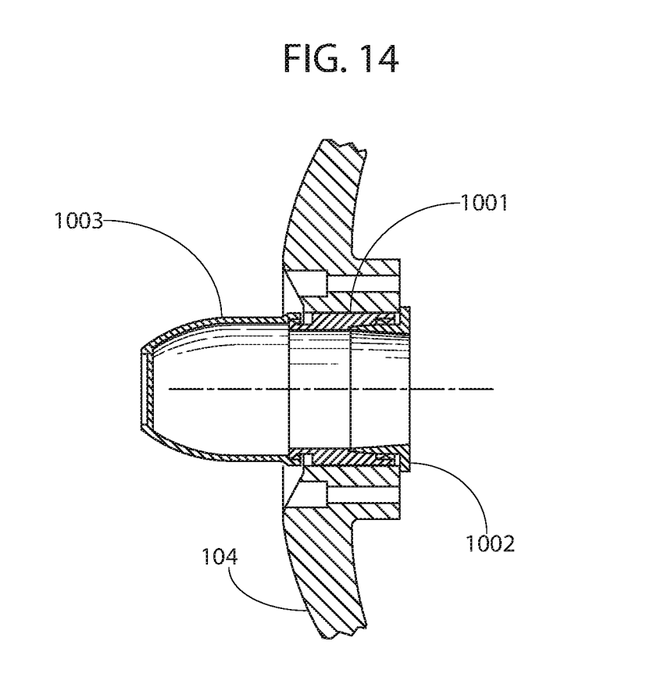
FIG. 14 illustrates a cross-sectional assembled view of a universal wheel cap assembly system in accordance with some exemplary embodiments of the present invention.

The next two figures show cross-sectional views of the wheel center cap assembly coupled to wheel 104, in accordance with he present invention. FIG. 13 illustrates a cross-sectional exploded view of universal wheel cap assembly 1000, and FIG. 14 illustrates a cross-sectional assembled view of universal wheel cap assembly 1000.

A method of installing assembly 1000 may include the following steps. Removing a wheel from the vehicle. Placing posterior support 1002 behind the wheel so that it is sandwiched between a wheel rotor of the vehicle and the vehicle wheel when the wheel is placed back onto the vehicle. This will secure the adapter inside the center aperture of the vehicle wheel. Inserting the adapter 1001 at least partially inside or within a center aperture 105 of vehicle wheel 104, so that the anterior region 1001a faces an anterior of the wheel 104 and so that the posterior region 1001b faces a posterior region of the wheel. The posterior region 1001b of the adapter 1001 is coupled to the anterior region 1009 of the posterior support 1002, for example by interlocking protrusions 1010 with 1011. Once the adapter and posterior support are secured to each other and the wheel, the wheel can be secured back to the vehicle and as mentioned above the flat posterior surface 1012 is sandwiched between a wheel rotor of the vehicle (not shown) and the vehicle wheel 104. This secures the posterior support once the vehicle wheel is secured with the lugs, which in turn secures the adapter inside the center aperture 105 of the vehicle wheel 104 by virtue of the adapter being secured to the posterior support 1002. With the wheel back on the vehicle, the removable wheel center cap 1003 can be coupled to the anterior region 1001a of the adapter, typically by registering protrusions 1007 of the removable wheel center cap 1003 with protrusions 1006 of the adapter 1001.

Wheel center cap assemblies and associated systems and methods of installing the same have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A wheel center cap assembly, comprising:
   an adapter configured to couple with a center region of a vehicle wheel and including a plurality of tracks disposed on a posterior surface of the adapter;
   a plurality of lug sleeves configured to couple with a plurality of lugs of the vehicle wheel, at least one of the plurality of lug sleeves slidably coupled to at least one of the plurality of tracks of the adapter; and
   a wheel center cap that registers or is integral with a center region of the adapter.

2. The wheel center cap assembly of claim 1, wherein the plurality of tracks extend radially from the center region of the adapter.

3. The wheel center cap assembly of claim 1, wherein the adapter comprises an annular or disk body.

4. The wheel center cap assembly of claim 1, wherein the adapter comprises:
   a planar smooth anterior surface.

5. The wheel center cap assembly of claim 1, wherein each lug sleeve comprises:
   a cylindrical body with a top surface and a bottom surface;
   a track receiving cavity on the top surface of the lug sleeve configured to register with at least one of the plurality of tracks of the adapter so that the lug sleeve can move along a length of the at least one of the plurality of tracks; and
   a lug receiving aperture on the bottom surface.

6. The wheel center cap assembly of claim 5, wherein the lug receiving aperture on the bottom surface of each lug sleeve includes a perimeter adapted to snap onto an existing wheel lug of the vehicle wheel.

7. The wheel center cap assembly of claim 1, wherein the wheel center cap is removable.

8. The wheel center cap assembly of claim 1, wherein the plurality of tracks are configured to accommodate a combination of 4 lug sleeve, 5 lug sleeves, 6 lug sleeves, or 8 lug sleeves.

9. The wheel center cap assembly of claim 8, wherein the plurality of tracks are labeled with markings adapted to instruct a user on a placement of the plurality of lug sleeves.

10. A wheel center cap assembly, comprising:
    an adapter having a disk body and configured to couple with a center region of a vehicle wheel, the adapter including a plurality of tracks on a posterior surface of the disk body that extend radially from a center region of the adapter; and
    a plurality of lug sleeves configured to couple with a plurality of lugs of the vehicle wheel, at least one of the plurality of lug sleeves slidably coupled to at least one of the plurality of tracks of the adapter; and
    a wheel center cap that registers or is integral with a center region of the adapter.

11. The wheel center cap assembly of claim 10, wherein each lug sleeve comprises:
   a cylindrical body with a top surface and a bottom surface;
   a track receiving cavity on the top surface of the lug sleeve configured to register with at least one of the plurality of tracks of the adapter so that the lug sleeve can move along a length of the at least one of the plurality of tracks; and
   a lug receiving aperture on the bottom surface.

12. The wheel center cap assembly of claim 11, wherein the lug receiving aperture on the bottom surface of each lug sleeve includes a perimeter adapted to snap onto an existing wheel lug of the vehicle wheel.

13. The wheel center cap assembly of claim 10, wherein the plurality of tracks are configured to accommodate a combination of 4 lug sleeves, 5 lug sleeves, 6 lug sleeves, or 8 lug sleeves.

14. The wheel center cap assembly of claim 1, wherein the plurality of tracks are labeled with markings adapted to instruct a user on a placement of the plurality of lug sleeves.

15. A wheel center cap assembly, comprising:
   an adapter configured to couple with a center region of a vehicle wheel, the adapter including a plurality of tracks;
   a plurality of lug sleeves configured to couple with a plurality of lugs of the vehicle wheel, at least one of the plurality of lug sleeves slidably coupled to at least one of the plurality of tracks of the adapter, wherein each lug sleeve comprises:
      a cylindrical body with a top surface and a bottom surface;
      a track receiving cavity on the top surface of the lug sleeve configured to register with at least one of the plurality of tracks of the adapter so that the lug sleeve can move along a length of the at least one of the plurality of tracks; and
      a lug receiving aperture on the bottom surface; and
   a wheel center cap that registers or is integral with a center region of the adapter.

16. The wheel center cap assembly of claim 15, wherein the plurality of tracks extend radially from the center region of the adapter.

17. The wheel center cap assembly of claim 15, wherein the adapter comprises a disk body and the plurality of tracks are disposed on a posterior surface of the disk body.

18. The wheel center cap assembly of claim 15, wherein the lug receiving aperture on the bottom surface of each lug sleeve includes a perimeter adapted to snap onto an existing wheel lug of the vehicle wheel.

19. The wheel center cap assembly of claim 15, wherein the plurality of tracks are configured to accommodate a combination of 4 lug sleeves, 5 lug sleeves, 6 lug sleeves, or 8 lug sleeves.

* * * * *